United States Patent

Wieger

[15] 3,647,034
[45] Mar. 7, 1970

[54] FLOATING OUTPUT WEDGE WITH ARTICULATED PULL ROD

[72] Inventor: George F. Wieger, South Bend, Ind.
[73] Assignee: The Bendix Corporation
[22] Filed: Aug. 20, 1970
[21] Appl. No.: 65,553

[52] U.S. Cl. ........................... 188/343, 74/110, 188/364
[51] Int. Cl. .................................................... F16d 51/22
[58] Field of Search ....................... 74/110; 188/343, 364

[56] References Cited

UNITED STATES PATENTS

| | | | |
|---|---|---|---|
| 1,848,775 | 3/1932 | Girling | 188/343 X |
| 3,317,010 | 5/1967 | Newstead | 188/343 |
| 3,362,506 | 1/1968 | Mossey | 188/343 |

Primary Examiner—Duane A. Reger
Attorney—Ken C. Decker and Plante, Hartz, Smith and Thompson

[57] ABSTRACT

A wedge-actuated drum brake is disclosed which includes the usual pair of brake shoes which are slidably mounted on a fixed support. The customary pair of actuator housings are disposed between adjacent ends of the two shoes. A pair of oppositely acting pistons are slidably disposed in each of the housings. One end of each of the pistons is operably connected to the corresponding ends of the brake shoes. The opposite adjacent ends of the pistons are spread apart by a wedge actuator when the brake is applied. The wedge actuator includes a pair of rollers which are mounted on a guide member for engaging the ends of the piston. The guide member is forced between the pistons by an actuating rod which also carries a wedge-shaped member that is adapted to force the rollers apart. The wedge is pivotally mounted on the actuating rod to permit the wedge to articulate as it is forced between the rollers, thus preventing damage to the wedge, the actuating rod, the rollers, or the guide member.

7 Claims, 4 Drawing Figures

PATENTED MAR 7 1972

INVENTOR.
GEORGE F. WIEGER

BY *Ken C. Decker*

ATTORNEY

PATENTED MAR 7 1972

INVENTOR.
GEORGE F. WIEGER
BY
ATTORNEY

FLOATING OUTPUT WEDGE WITH ARTICULATED PULL ROD

BACKGROUND OF THE INVENTION

This invention relates to a wedge-actuated drum brake.

Wedge-actuated drum brakes have become increasingly popular for use on heavy duty vehicles. Prior art wedge brakes have included a wedge that is rigidly connected to an actuating rod which also carries a guide member on which a pair of rollers are mounted. One of the problems encountered with this design is that when the brake is abruptly applied one of the actuating pistons is forced against the appropriate anchoring member inside the actuating housing. When this occurs, the actuating wedge and the guide member were often destroyed, thereby making the brake inoperable.

SUMMARY OF THE INVENTION

Therefore, an important object of my invention is to provide a wedge-actuated drum brake in which the wedge is pivotally mounted on the actuating rod so that the wedge will yield when the anchor piston is forced against the anchoring surface within the actuating housing, thereby preventing destruction of the brake.

Another important object of my invention is to insure that the wedge-actuating member is properly aligned with the rollers mounted on the guide member at all times when the brake is applied.

Still another important object of my invention is to increase the reliability of wedge-actuated drum brakes.

DETAILED DESCRIPTION

Figure 1:
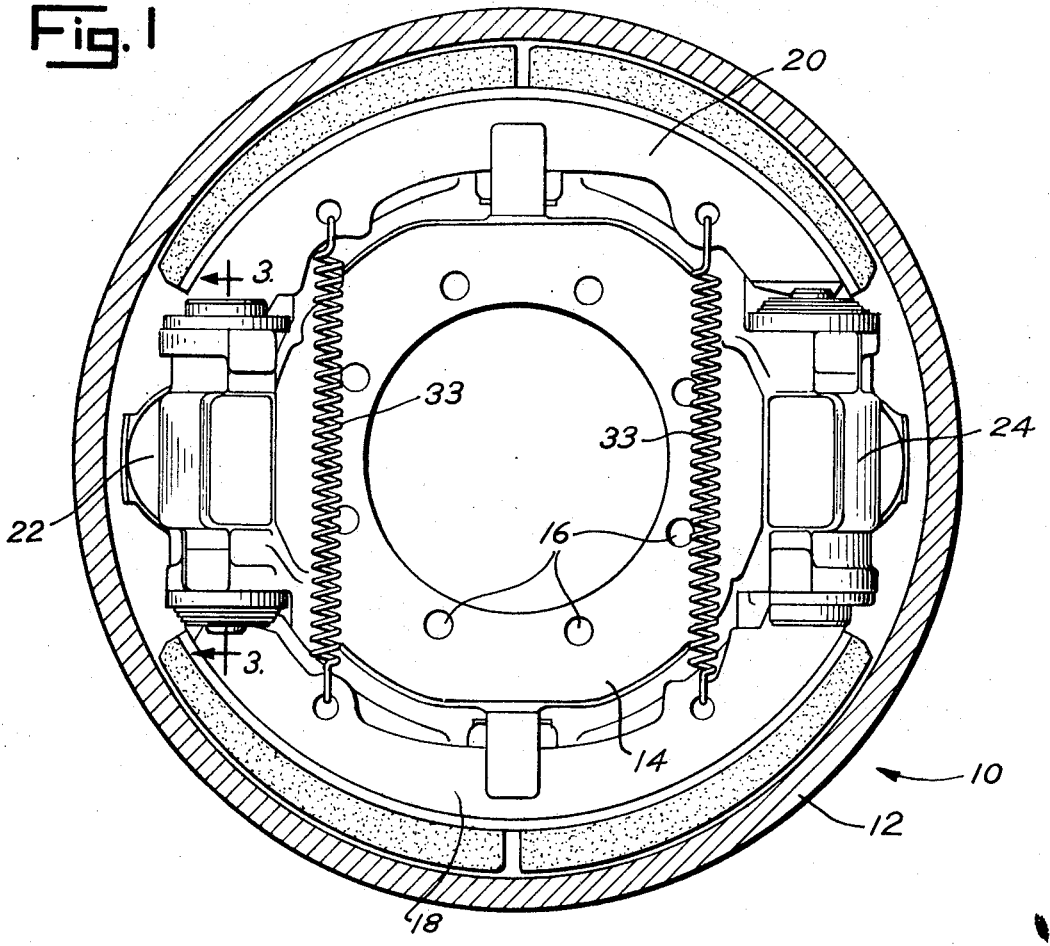
FIG. 1 is a front elevational view of the brake assembly made pursuant to the teachings of my present invention.
Figure 2:
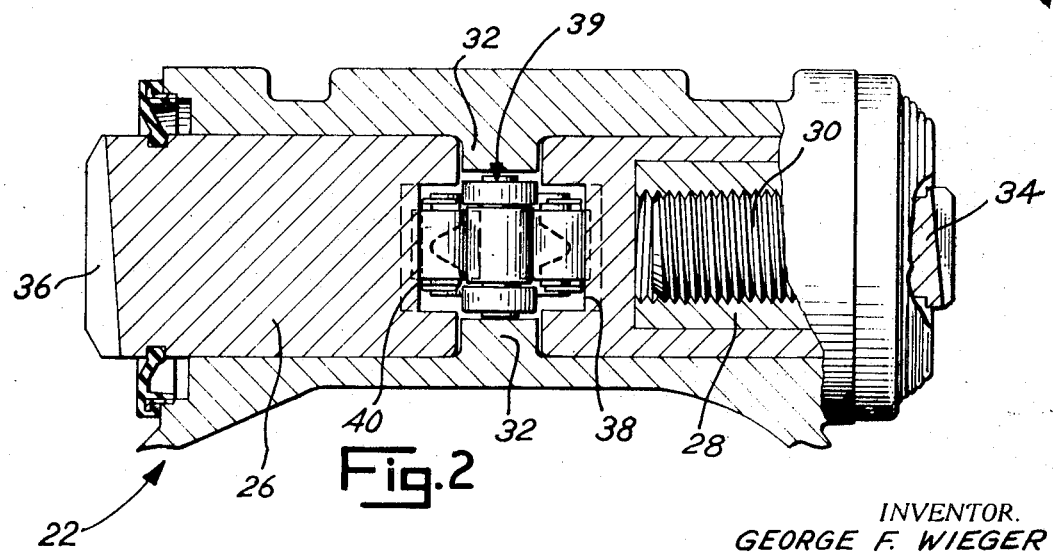
FIG. 2 is a cross-sectional view taken along line 2—2 of FIG. 3.

Referring now to the drawings a wedge-operated drum brake assembly 10 includes a drum 12 mounted for rotation with a member to be braked (not shown). A torque member 14 is mounted on a nonrotative part of the vehicle, such as the axle flange, by inserting bolts through circumferentially spaced openings 16. A pair of brake shoes 18, 20 are slidably mounted on the brake torque member 14 for movement toward and away from the drum 12. A pair of diametrically opposed housings 22, 24 are formed integrally with the torque member 14 between adjacent ends of the shoes 18, 20. Each of the housings 22, 24 define a bore 25 herewithin which contain a pair of piston assemblies 26, 28, the latter of which contains an adjuster mechanism generally indicated at 30 for moving the shoes 18, 20 closer to the drum to compensate for wear of the friction material. Adjuster mechanism 30 is disclosed in detail in U.S. Pat. No. 3,246,723, owned by the assignee of the present invention and incorporated herein by reference. Both of the piston assemblies 26, 28 engage the anchor flanges 32 when the brake is released, and one of the assemblies 26 or 28 anchors on the flanges 32 during a brake application, depending upon the direction of drum rotation, as will be more completely described herein. A pair of return springs 33 yieldably bias the shoes 18, 20 away from the drum 12. The outer ends 34, 36 of the pistons 26 and 28 are connected to a corresponding end of one of the brake shoes 18 or 20. The opposite adjacent ends of the pistons 26, 28 are provided with grooves 38, 40 which are adapted to receive an actuating mechanism generally indicated at 39 which is thrust between the pistons during a brake application.

Actuating mechanism 39 includes an elongated member or actuating rod 41, one end of which is received within a conventional air cylinder (not shown) which is mounted on the lower end of the neck 42 of the actuator housing 22. The other end of the rod 41 terminates in a bifurcated portion 44 which presents a pair of arms 46 and 48. A tapered, wedgelike member 50 is pivotally suspended from the arms 46 and 48 by a pin 52. The wedgelike member 50 includes a relative narrow portion 54 adjacent the pin 52, a wider portion 56, and a pair of camming surfaces 58, 60 which interconnect the portions 54 and 56. A guide 62 includes a pair of spring arms 64, 66 each of which include a roller 68, 70 mounted on the outer end thereof. The arms 64, 66 extend upwardly adjacent the camming surfaces 58, 60 from the bottom of the bifurcated portion 44. The resiliency of the arms 64, 66 yieldably bias the rollers 70, 68 towards the narrower portion 54 of the wedge 50. The guide 64 is carried by the actuating rod 41; however, the rod 41 can move relative to the guide 62 for a short distance to enable the wedge 50 to force the rollers 70 and 68 apart. A caged spring assembly 72 yieldably urges the actuating mechanism 38 from between the pistons 26, 28 toward the brake release position. The guide 62 is identical to the device disclosed in U.S. Pat. No. 3,362,506, owned by the assignee of the present invention and incorporated herein by reference.

MODE OF OPERATION

Figure 3:
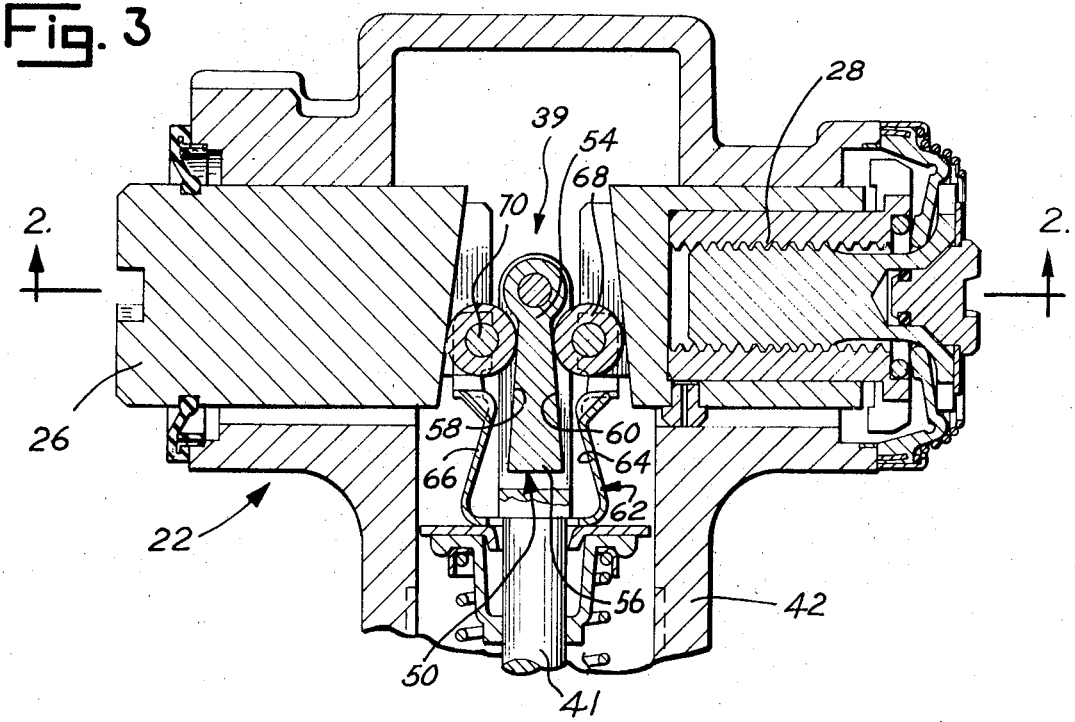
FIG. 3 is an enlarged cross-sectional view taken along line 3—3 of FIG. 1.
Figure 4:
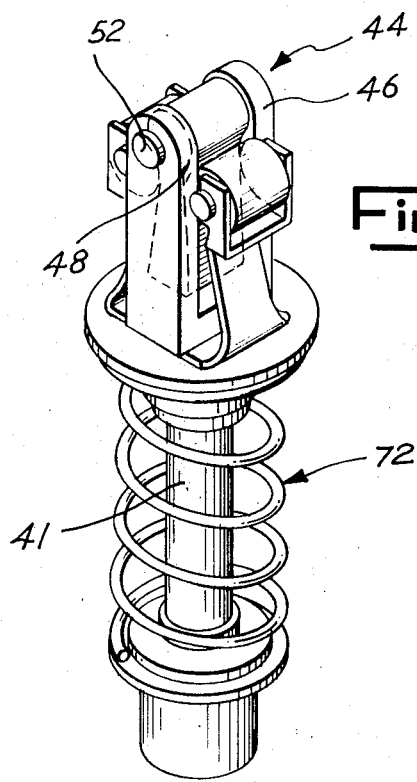
FIG. 4 is a perspective view of the wedge actuator illustrated in FIGS. 2 and 3.

When the brakes of the vehicle are applied, the vehicle operator depresses the usual brake pedal mounted in the operator's compartment, which opens a valve to admit pressurized air into the aforementioned air chamber (not shown). Air pressure in the air chamber acts on the lower end of the actuating rod 41, forcing the latter, and therefore the guide 62 and wedge 50, between the pistons 26 and 28. Because of the tapered construction of the grooves 38 and 40 as illustrated in FIG. 3, movement of the guide 62 in the wedge 50 within the grooves forces the pistons to move outwardly within the bore 25 defined by the actuator housing 22. Since the outer ends of the pistons 26 and 28 are secured to the brake shoes 18 and 20, this movement of the pistons 26 and 28 forces the brake shoes 18 and 20 against the drum 12. Further movement of the actuating rod 41 moves the wedge 50 relative to the rollers 68 and 70. Since the rollers are held against the corresponding camming surfaces 58 or 60 of the wedge 50, the camming surfaces 58 and 60 spread the rollers apart a small additional distance thus driving the shoes 18 and 20 into firm frictional engagement with the drum 12.

As the shoes 18 and 20 contact the drum 12, the shoes travel with the drum in a circular path until the inner end of the piston 26 anchors on the anchor flange 32. This force, which drives the piston 26 into engagement with the flange at 32, is relatively large magnitude. Therefore, in prior art wedge brakes which provided a wedge that was integral with the actuating rod, movement of the anchor piston into engagement with the anchor flange drove the roller disposed between the piston and the wedge tightly against the latter, often bending the resilient arms of the guide member and damaging the actuating rod. The device disclosed herein substantially eliminates this problem. When the piston 26 moves against the anchor flange 32, thereby driving the roller 70 a small distance to the right viewing FIG. 3, the wedge 50 articulates about the pin 52, thereby preventing destruction of the arm 66, and therefore preventing the wedge from bending relative to the actuating rod 40. The articulated wedge 50 is therefore properly aligned with the roller 68 and 70 at all times during a brake application.

I claim:

1. In a brake:

a drum mounted for rotation with a member to be braked;
a fixed support;
a pair of brake shoes slidably mounted on said fixed support;
a housing defining a bore therewithin mounted on said housing between contiguous ends of said shoes;

a pair of pistons slidable in said bore, one end of each of said pistons being connected to a corresponding one of said shoes; and actuating means for spreading said pistons upon actuation of the brake including an elongated member, a tapered member pivotally connected to said elongated member, a guide member mounted on said elongated member for longitudinal movement with and relative to said elongated member, said guide member carrying antifriction means for engagement with the other ends of said pistons, said elongated member first forcing said guide means between said pistons, said tapered member thereafter further spreading said antifriction means apart to force the brake shoes more tightly against the drum.

2. The invention of claim 1:

said tapered member having a narrow portion, a wider portion and a pair of camming surfaces extending therebetween;

said narrow portion being pivotally connected to said elongated member to permit the latter to pull the tapered member between said antifriction means when the brake is applied.

3. The invention of claim 1:

said elongated member having a bifurcated end presenting a pair of arms;

said tapered member being disposed between said arms and pivotally connected to each of the latter.

4. The invention of claim 3:

said tapered member having a narrow portion, a wider portion, and a pair of camming surfaces extending therebetween;

said narrow portion being pivotally connected to each of said arms to permit the latter to pull the tapered member between said antifriction means when the brake is applied.

5. The invention of claim 3: and a pin extending between said arms and through the narrow portion of said tapered member to pivotally connect the latter to the elongated member.

6. An actuator assembly comprising:

an actuating member;

a guide member mounted on said actuating member for longitudinal movement relative to and with said actuating member, a tapered member carried by said actuating member having a narrower portion, a wider portion, and a pair of opposed camming surfaces extending therebetween;

said guide member having a pair of resilient legs each biased in a direction toward a respective one of said camming surfaces;

antifriction means mounted on each of said legs for movement therewith;

each of said legs biasing its respective antifriction means toward a corresponding one of said camming surfaces;

the narrower portion of said tapered member being pivotally connected to said activating member to permit said activating member to pull said tapered member between said antifriction means.

7. The invention of claim 6:

said actuating member being a rod having a bifurcated end presenting a pair of arms;

said tapered member being disposed between said arms and pivotally connected to each of the latter.

* * * * *